J. C. DAVIS.
OPEN HEARTH FURNACE.
APPLICATION FILED MAR. 25, 1914.
1,143,690.  Patented June 22, 1915.
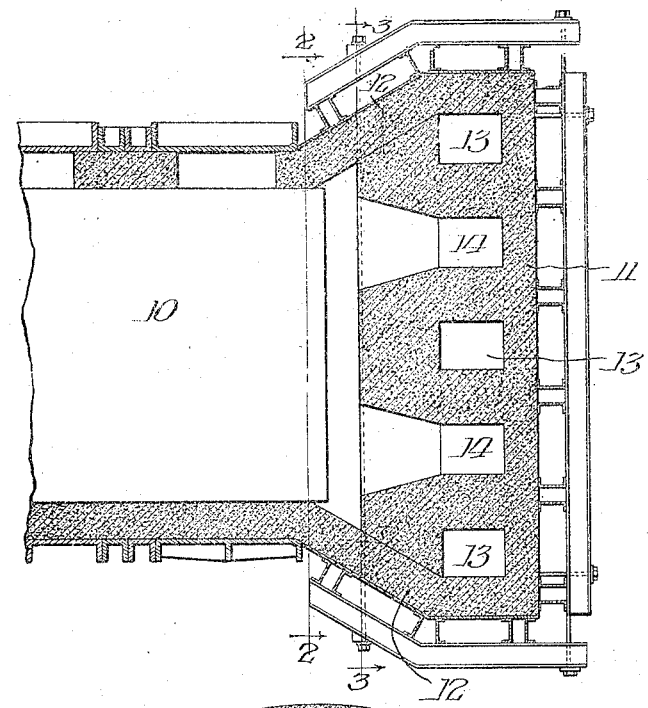
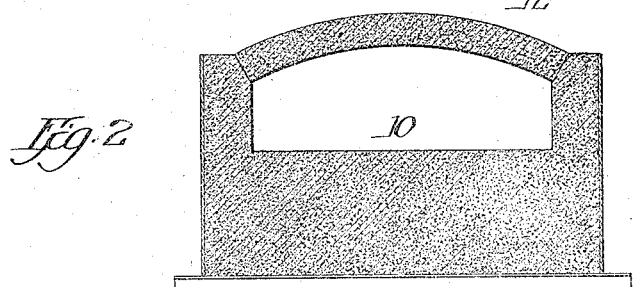
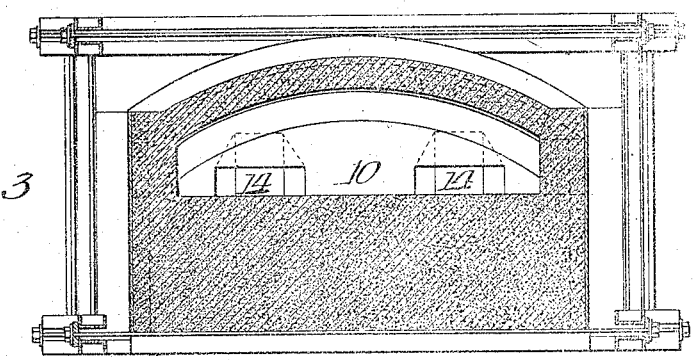

UNITED STATES PATENT OFFICE.

JAMES C. DAVIS, OF HINSDALE, ILLINOIS, ASSIGNOR TO AMERICAN STEEL FOUNDRIES, OF NEW YORK, N. Y., A CORPORATION OF NEW JERSEY.

OPEN-HEARTH FURNACE.

1,143,690.  Specification of Letters Patent.  Patented June 22, 1915.

Application filed March 25, 1914. Serial No. 827,098.

*To all whom it may concern:*

Be it known that I, JAMES C. DAVIS, a citizen of the United States, and resident of Hinsdale, in the county of Cook and State of Illinois, have invented certain new and useful Improvements in Open-Hearth Furnaces, of which the following is a specification.

My invention relates to open hearth furnaces and has particularly reference to a novel end construction as applied to such furnaces.

It is a well known fact that in ordinary open hearth furnaces the gases of combustion attain their maximum temperature at the end of the furnace opposite that from which they enter and this point of maximum temperature is usually at or near the end of the bath of metal and in close proximity to the end walls of the furnace, which walls serve to deflect the gases downwardly into the slag pockets leading to the regenerative chamber. These end walls tend to burn out much more quickly than other portions of the furnace wall for the obvious reason that they are subjected to the highest temperature and to the force of the gases when deflected from their normal path as is necessary.

I have conceived the idea that if the exhaust gases are allowed to expand immediately after leaving the furnace, the velocity of the gases will be reduced in proportion to the change in volume due to expansion and that while the same number of heat units will be present in the exhaust gases, this heat will be less intense and by reason of the reduced velocity due to the increased volume will be radiated more readily without destruction of the furnace walls.

My invention may therefore be said to consist in an open hearth furnace so constructed as to permit an expansion of the exhaust gases immediately after leaving the hearth.

The invention will be more readily understood by reference to the accompanying drawings, wherein, Figure 1 is a horizontal section through a portion of an open hearth furnace showing my novel end construction; Fig. 2 is a section on the line 2—2 of Fig. 1, and Fig. 3 is a section on the line 3—3 of Fig. 1.

Referring more particularly to the drawings it will be seen that I provide the usual open hearth furnace 10, having an end wall 11, of considerable greater transverse width than the furnace. This end wall 11 is connected to the furnace walls by the diagonal walls 12. Mounted within the end construction are air flues 13, and gas flues 14. By thus providing a widened end I am enabled to construct flues of much greater total relative volume than is customary. Thus it will be seen that as the hot gases pass from the hearth they are at once permitted to expand into a space of increasing capacity and that therefore their velocity is decreased in proportion to the increase in volume. Such gases being therefore of a greater volume and decreased velocity will transmit less of their heat to the surrounding walls and such walls being of greater area will absorb such heat with less damage to themselves.

It will be noted that the side walls of the furnace are parallel, and it will be understood that the cross sectional area of the furnace is substantially constant from end to end thereof. Of course, there may be some variation from time to time, due to changes in the hearth. The present invention contemplates the addition to a furnace of this description of flaring walls at both ends, whereby the gases expand into an enlarged space.

The construction shown in the drawings is only typical of different forms in which the invention may be exemplified. I do not wish therefore to be limited to the form herein shown and described.

I claim:

1. In combination, a furnace of substantially uniform cross sectional area from end to end thereof, said furnace having flaring end walls, thereby providing flues having a cross sectional area greater than that of the furnace, substantially as described.

2. In combination, a furnace having straight, substantially parallel inside walls and outwardly flaring end walls, thereby providing flues of greater cross sectional area than the cross sectional area of the furnace at the point of discharge into said flues, substantially as described.

JAMES C. DAVIS.

Witnesses:
J. F. LYNN,
GEO. G. FLOYD.